(12) United States Patent
Nagy et al.

(10) Patent No.: US 8,244,394 B2
(45) Date of Patent: Aug. 14, 2012

(54) GLASS PRODUCTION LINE HAVING DYNAMIC PRODUCTION CONTROL AND A TEMPERING FURNACE WITH A DEDICATED DELIVERY DEVICE AND A METHOD OF CONTROLLING A GLASS PRODUCTION LINE TEMPERING FURNACE

(75) Inventors: Akos Nagy, Sewickley, PA (US); Philip Plant, Zelienople, PA (US); William Billinger, Zelienople, PA (US)

(73) Assignee: HP3 Software Incorporated, Sewickley, PA (US)

( * ) Notice: Subject to any disclaimer, the term of this patent is extended or adjusted under 35 U.S.C. 154(b) by 102 days.

(21) Appl. No.: 12/709,694

(22) Filed: Feb. 22, 2010

(65) Prior Publication Data
US 2010/0269544 A1 Oct. 28, 2010

Related U.S. Application Data

(63) Continuation of application No. PCT/US2008/074127, filed on Aug. 22, 2008.

(60) Provisional application No. 60/957,231, filed on Aug. 22, 2007, provisional application No. 61/080,903, filed on Jul. 15, 2008, provisional application No. 61/080,918, filed on Jul. 15, 2008, provisional application No. 61/080,952, filed on Jul. 15, 2008.

(51) Int. Cl.
*G06F 19/00* (2011.01)
(52) U.S. Cl. ........................................ 700/157; 700/171
(58) Field of Classification Search .................. 700/157, 700/158, 171, 209
See application file for complete search history.

(56) References Cited

U.S. PATENT DOCUMENTS
5,187,670 A * 2/1993 Keil et al. ..................... 700/209
(Continued)

FOREIGN PATENT DOCUMENTS
WO 2009/055135 4/2009

OTHER PUBLICATIONS

Ham, M., Raiford, M., Dillard, F. Risner, W., Knisely, M., Harrington, J., Murtha, T., Park, H. "Dynamic Wet-Furnace Dispatching/Scheduling in Wafer Fab". IEEE/SEMI Advanced Semiconductor Manufacturing Conference (2006): 144-147.*

(Continued)

*Primary Examiner* — Ryan Jarrett
(74) *Attorney, Agent, or Firm* — Blynn L. Shideler; Krisanne Shideler; BLK Law Group

(57) ABSTRACT

A glass production line comprising a cutting table, a tempering furnace having a loading station that includes a changeable set of uniquely identifiable work-piece storage loading locations adjacent the loading station with each storage loading location receiving a work-piece therein for subsequent furnace processing, wherein a subset of the uniquely identifiable work-piece storage loading locations is moved away from the loading station when it is emptied of furnace work-pieces and a new sub-set of uniquely identifiable work-piece storage loading locations is moveable adjacent the loading station to provide the changeable set of uniquely identifiable work-piece storage loading locations adjacent the loading station, and a dynamic optimizer coupled to the furnace for dynamically scheduling furnace layouts for glass work-pieces to be tempered, wherein the dynamic furnace optimizer is adapted to schedule work-pieces from uniquely identifiable work-piece storage loading locations not currently adjacent the unloading station based upon a minimum yield gain.

19 Claims, 7 Drawing Sheets

U.S. PATENT DOCUMENTS

| | | | |
|---|---|---|---|
| 5,295,065 A * | 3/1994 | Chapman et al. | 700/99 |
| 5,791,971 A | 8/1998 | Dickinson et al. | |
| 6,463,762 B1 | 10/2002 | Ross, Jr. | |
| 6,810,784 B1 | 11/2004 | Cunningham | |
| 6,879,873 B2 | 4/2005 | Passant | |
| 7,043,317 B1 * | 5/2006 | Rust et al. | 700/99 |
| 7,043,323 B2 | 5/2006 | Passant | |
| 7,269,526 B2 * | 9/2007 | Muro et al. | 702/84 |
| 2003/0226433 A1 | 12/2003 | Passant | |
| 2005/0182506 A1 | 8/2005 | Passant | |
| 2007/0112451 A1 * | 5/2007 | Clayton et al. | 700/100 |

OTHER PUBLICATIONS

Wang, Y. "Batchless Layout Optimization Used in the Glass Tempering Process". $1^{st}$ WSEAS Int. Conf. on Computational Chemistry (Dec. 2007): 109-114.*

Jalkanen, E. "How to Improve Your Profitability with the Lastest Glass Processing Machinery and Software Solutions". Glass Performance Days 2009: 791-794.*

Gfeller, H. "Dynamic Sorting System 'First'sort' for Insulating Glass Manufacturing" Glass Performance Days 2007: 510-512.*

Mulhauns, K. "New Sorting Technology in the Cutting Area: Steady Glass Flow—Optimum Output". Glass Processing Days 2005: 1-3.*

* cited by examiner

Schedule 335, run 203   14
Glass : Gyds 130x96
Yield : 92.7 (92.7)

| Label | Seq. | Order | Rack/Atrm | Hor. x Ver. | Shape |
|-------|------|-------|-----------|-------------|-------|
| A 1.77 | 1 | 791800.001 | A 1.77 | 36 ¾ x 36 ⅞ | - |
| A 1.78 | 2 | 791800.001 | A 1.78 | 36 ¾ x 36 ⅞ | - |
| A 1.81 | 3 | 791800.001 | A 1.81 | 36 ¾ x 36 ⅞ | - |
| A 1.49 | 4 | 791800.001 | A 1.49 | 19 ⅜ x 71 15/16 | - |
| A 1.51 | 5 | 791800.001 | A 1.51 | 19 ⅜ x 71 15/16 | - |
| A 1.53 | 6 | 791800.001 | A 1.53 | 19 ⅜ x 71 15/16 | - |
| A 1.75 | 7 | 791800.001 | A 1.75 | 36 ¾ x 52 ⅝ | - |
| A 1.55 | 8 | 791800.001 | A 1.55 | 19 ⅜ x 71 15/16 | - |

Fig. 2

GLASS PRODUCTION LINE HAVING DYNAMIC PRODUCTION CONTROL AND A TEMPERING FURNACE WITH A DEDICATED DELIVERY DEVICE AND A METHOD OF CONTROLLING A GLASS PRODUCTION LINE TEMPERING FURNACE

RELATED APPLICATION

This application is a continuation of International Patent Application Ser. No. PCT/US2008/074127 entitled "A Glass Production Line having Dynamic Production Control and a Tempering Furnace with a Dedicated Delivery Device and a Method of Controlling a Glass Production Line Tempering Furnace" filed Aug. 22, 2008 and which published as WO2009-055135, which is incorporated herein by reference. International Patent Application Ser. No. PCT/US2008/074127 claimed the benefit of U.S. Provisional Patent applications 60/957,231 filed Aug. 22, 2007; 61/080,903 filed Jul. 15, 2008; 61/080,918 filed Jul. 15, 2008; and 61/080,952 filed Jul. 15, 2008.

BACKGROUND OF THE INVENTION

1. Field of the Invention

The present invention relates to glass processing equipment with dynamic production control. Specifically, the invention relates to a dynamic tempering furnace optimizer for tempering furnace of a glass cutting line, a glass production line having dynamic production control and a method of controlling a glass production line tempering furnace.

2. Background Information

Glass processing equipment including glass cutting lines that have glass cutting tables, are well-known in the art, such as those sold by the assignee of the present invention, Billco Manufacturing, Inc. The central piece of equipment in the glass cutting line is the glass cutting table, examples of which are described in U.S. Pat. Nos. 5,791,971, 6,463,762 and 6,810,784, which are incorporated herein by reference. The glass cutting table is designed to cut generally rectangular glass sheets into a plurality of individual glass work pieces for subsequent manufacturing. The typical glass cutting line will also include a sheet feeding device upstream of the glass cutting table for feeding the glass sheets to be cut to the glass cutting table. The sheet feeding device may be in the form of an air float table to which individual glass sheets to be cut are fed, such as from a storage rack, and then aligned prior to forwarding to the glass cutting table.

A known glass cutting line arrangement will also include a sorting device downstream of the glass cutting table where the cut glass sheets are individually sorted by the specific glass work pieces into storage racks, generally called harp racks. A harp rack is provided with a number of slots, such as 100, for receiving the individual cut glass work pieces. The sorting device may be formed as an air float table with a plurality of adjacent harp racks. The harp racks are moved to the next part of the assembly operation.

Existing glass cutting lines typically utilize a production control system designed to minimize scrap. Previously, a specific cutting schedule for a production run, or single batch, was prepared in advance by the control system. The production run essentially corresponded to the number of harp racks and associated slots at the sorting station. Basically, older optimization programs were used to determine the optimal cutting schedule for filling the slots of the harp racks with the desired glass work pieces.

The cutting schedule essentially refers to the collection of layouts of the individual glass work pieces on all the glass sheets to be cut for the production run or batch. Following the batch production run, the filled harp racks were moved to the next location in the manufacturing process. The older optimization systems were limited by several problems. First, each system was limited by the number of available slots in the available harp racks. In general, the greater the number of slots the greater the yield since the optimizing program will have a greater number of pieces to select from to maximize product yield. Second, the harp racks generally could not be moved until the entire production run is completed, including the re-cuts at the end of the batch process. Third, the existing last sheet problem increased yield loss, even with re-cuts incorporated into the last sheet. Additionally, the existing older systems do not easily accommodate special pieces not accounted for in the production run.

The problems with older optimizers on cutting lines were addressed by Billco Manufacturing with the development of the Batch Ban® glass equipment optimization product. This system provided a dynamic cutting line control system that includes an optimizer coupled to the controller of the glass cutting table optimizing the glass work piece layout on the individual sheets of glass. The optimizer includes a dynamically adjustable bias or biasing feature for favoring individual cut glass work pieces assigned to a leading storage position such as in a harp rack, whereby the bias will tend to position and cut the glass work pieces assigned to the leading position or harp rack on leading sheets to completely fill the leading harp rack in a minimum time. The control system further accommodates removal of a filled leading harp rack from the glass cutting line, with the system designating a new leading harp rack for the optimizer, which then dynamically adjusts the bias and associated cutting scheduling. This system provides an optimization system that operates "on the fly" allowing the previous batch type systems to be continuous or semi-continuous processes. The Batch Ban® product is described, in part in U.S. Pat. Nos. 7,043,323 and 6,879,873 and these patents are incorporated herein by reference.

The patent application that issued as U.S. Pat. Nos. 7,043,323, discussed above, published as U.S. Publication No. 2005-0182506 on Aug. 18, 2005. U.S. Publication No. 2005-0182506 was cited by the examiner in parent international Patent Application Ser. No. PCT/US2008/074127 as a "document defining the general state of the art which is not considered to be of particular relevance" to the claims of that application. Similarly, patent application that issued as U.S. Pat. Nos. 6,879,873, discussed above, published as U.S. Publication No. 2003-0226433 on Dec. 11, 2003. U.S. Publication No. 2003-0226433 was cited by the examiner in parent international Patent Application Ser. No. PCT/US2008/074127 as a "document defining the general state of the art which is not considered to be of particular relevance" to the claims of that application.

The Batch Ban® product can also be described as overlapping batches that are dynamically optimized "on the fly". The Batch Ban® product is not limited to the pieces designated for the storage locations currently at the cutter break out table. As noted in U.S. Pat. No. 6,879,873, it is also known to have one harp rack, or storage location, that is designated for "rare" pieces, or pieces that are not in the production cycle for some time, and this is called the rare rack. The rare rack acts as a storage location for pieces until needed, which is until the rack that they are associated with is moved into position on the break out table.

The commercial implementation of the Batch Ban® product has resulted in large commercial savings where implemented. There is a need to expand the applications for the dynamic optimization system of the Batch Ban® type product.

A separate glass processing step for many glass types is tempering through a tempering oven. Conventional tempering ovens will have a loading zone where the glass work pieces are loaded onto a moving bed of the furnace, a heating zone, a cooling zone and an unloading zone. A conveyer generally operates in a continuous fashion moving pieces through the tempering furnace.

It is known for workers loading a tempering furnace to have a specified layout prepared by a tempering furnace optimizer, such as, for example the BEDMATE™ product sold by PMC Software. The workers at the unloading zone will typically be provided a layout and identification of the work pieces as they exit the furnace so they can be sorted and racked accordingly. The input and output assistance is generally through graphical displays at each end of the furnace.

PMC Software attempted to increase productivity and throughput by trying to more fully automate processing from Cutting to Tempering. They provided a revised direct feed system in which cut glass is conveyed directly from the glass cutting line to the tempering furnace, eliminating the need to rack glass as it travels between these work centers in order to reduce the possibility of scratching or breaking caused by excessive handling. The direct feed system from PMC Software allows the user to process tempered requirements without the need to sort and rack cut glass. Operators still build tempered batch loads by viewing a TV monitor display and placing each lite within a batch on the load bed as shown on the display. In this direct feed automated process, orders are first scheduled for production and then optimized in batch type optimizer. Using the breakout sequence of the optimized layouts, a tempering optimizer portion of the system then determines the best orientation of the pieces to meet roll distortion requirements and to optimize the load bed. Once a production schedule is optimized, it is available to the cutting machine operator via the local area network. When an optimized layout has been cut and conveyed to the breakout table, the Breakout Display will automatically display that layout to demonstrate which lite is to be loaded first onto the conveyor feeding the load bed of the tempering furnace, as each lite is identified by a sequential loading number. To insure the orientation of each lite placed on the conveyor is correct, it is loaded base first. A sequence number is also displayed on the tempering furnace Load Display showing where each lite is to be placed within a tempering load. As a load exits the tempering furnace, the Off-Load Display identifies each lite within that load to assist off-load personnel in either packing or racking tempered lites.

It is well known that glass work pieces can be and are damaged at every stage of the production cycle. It is often considered that the more handling steps that are incurred with a work piece the greater the likelihood of damage to the work piece. In addition to scratching due to handling, miss-breaks, work pieces can be irreparably damaged in the tempering furnace itself. Regardless of the cause, the damaged pieces must be replaced. Traditionally, in batch production, these replacement pieces are run following the completion of the current batch. This final replacement batch can significantly hinder the production as it may result in exceptionally low yields as there can be very limited glass types in this final batch process.

U.S. Pat. No. 6,810,784 was cited by the examiner in parent international Patent Application Ser. No. PCT/US2008/ 074127 as a "document defining the general state of the art which is not considered to be of particular relevance" to the claims of that application. U.S. Pat. No. 6,810,784 discloses a glass transporting and locating system for a glass cutting table with a bridge extending across the glass cutting table which is movable along the length of the glass cutting table. A glass work-piece feeding table is positioned adjacent the glass cutting table and adapted to support a glass work-piece to be fed to the glass cutting table. At least one vacuum chuck is carried by the bridge at a position which can overlap a glass work-piece supported on the glass work-piece feeding table when the bridge is at one end of the glass cutting table. The system includes a device for aligning the glass work-piece which is supported on the glass work-piece feeding table. The alignment device may include a retractable stop on the bridge or on the glass work-piece feeding table. The retractable stop on the bridge may also be used for advancing finished work-pieces off of the glass cutting table. The glass work-piece transporting and locating system is adapted to be easily retrofitted to existing glass cutting tables. U.S. Pat. No. 6,810, 784 is discussed herein for completeness in light of its citation in the search report of the parent application, but this patent does not directly relate to the glass production lines of the present invention.

It is an object of the present invention to improve the efficiencies of glass production lines incorporating a tempering furnace.

SUMMARY OF THE INVENTION

In accordance with one aspect of the present invention a glass production line comprises a glass production line comprising: a cutting table; a dedicated delivery device feeding work pieces from the cutting table to the tempering furnace; a tempering furnace downstream of the cutting table; and a dynamic optimizer coupled to the tempering furnace for dynamically scheduling furnace layouts for glass work pieces to be tempered within the furnace.

In accordance with one aspect of the present invention a glass production line comprises a cutting table, a tempering furnace downstream of the cutting table, wherein the furnace includes a loading station that includes a changeable set of uniquely identifiable work piece storage loading locations adjacent the loading station with each storage loading location adapted to receive a work piece therein for subsequent processing on the tempering furnace, wherein a subset of the uniquely identifiable work piece storage loading locations is moved away from the loading station when it is emptied of work pieces for the tempering furnace and a new sub-set of uniquely identifiable work piece storage loading locations is moveable adjacent the loading station to provide the changeable set of uniquely identifiable work piece storage loading locations adjacent the loading station, and a dynamic optimizer coupled to the tempering furnace for dynamically scheduling furnace layouts for glass work pieces to be tempered within the furnace, wherein the dynamic furnace optimizer is adapted to schedule work pieces from uniquely identifiable work piece storage loading locations not currently adjacent the unloading station based upon a minimum yield gain.

In accordance with one aspect of the present invention a production control system for glass production line having tempering furnace and glass cutting table is provided. The production control system has a dynamic optimizer coupled to the glass cutting table for dynamically scheduling cutting schedules for the glass cutting table, including dynamically incorporating replacement pieces into the cutting schedule. The production control system has a dynamic optimizer coupled to the tempering furnace for dynamically scheduling furnace layouts for glass work pieces to be tempered within the furnace. The furnace optimizer is integrated with the glass cutting table optimizer, whereby furnace operators can input work pieces to be dynamically scheduled directly into the cutting table optimizer.

Within the meaning of this application the phrase "glass work piece" will reference all elements or components of glass assemblies within a glass production line, including glass sheets from which individual pieces of glass are cut, glass lites (often referencing the individual cut glass pieces), muttons, spacers, sealing elements, assembled glass units, and others. Essentially the phrase "glass work piece" references all elements that are processed in a glass production line to form a final glass assembly, including sub-components that are not formed of glass.

Within the meaning of this application a "Production Control System" references glass work piece schedulers that are used to calculate and identify which operations are performed, in what order and or position to perform specified processing steps on given glass work pieces, and on what equipment.

Within the meaning of this application a glass production line references a glass work piece processing line in which glass work pieces are altered, such as for the construction of IG windows and doors and the like.

Within the meaning of this application a tempering furnace or furnace is a unit designed to provide specified heat treatment of glass work pieces, mainly cut glass elements, according to a determined formula. The heat treatment applied can, and often does, vary between individual glass work piece types. These are also called tempering units or tempering ovens in the art.

Within the meaning of this application a glass cutting table, or cutting table, is a glass processing unit that is designed to cut or score glass sheets into individual glass work pieces, sometimes called lites. The scored glass sheets will typically be separated into individual glass work pieces for subsequent processing, and into scrap elements for recycling, on a break out table. The break out table may be manual or automatic. The break out table may be considered as the last part of the cutting table for this application.

Within the meaning of this application an optimizer is a production control unit that generates a schedule of glass work pieces for a specified piece of glass processing equipment, such as a cutting table or a tempering furnace, in accordance with pre-defined efficiency and/or yield improving rules and algorithms.

Optimizers can either be batch optimizers or dynamic optimizers. A Batch Optimizer will consider and place each glass work piece within ONLY one schedule, which is run until that schedule is completed. A Batch Optimizer will not consider a given glass work piece within two separate schedules. Replacement pieces are considered as distinct pieces for the purpose of this definition as they require a uniquely separate work piece to form these components.

In contrast with a Batch Optimizer, a Dynamic Optimizer will consider and place at least some of the glass work pieces within multiple schedules. The dynamic term references the ability of the optimizer to "re-optimize" the schedule "on the fly", whereby the position of a glass work piece can change in the final production schedule. A Dynamic Optimizer may be accurately described as utilizing a series of overlapping batches. The leading example of a Dynamic Optimizer is the Batch Ban® product for cutting tables from HP3.

Another manner of describing and defining the Dynamic Optimizer is that in a Dynamic Optimizer the pool of inputs of potential glass work pieces to be scheduled and considered is continuously changing during a production run. This contrasts with a Batch Optimizer which utilizes a fixed pool of inputs of potential glass work pieces to be scheduled for that batch production run.

Within the meaning of this application a cutting schedule is the production schedule for the cutting table to follow. The cutting schedule will identify which sheet of glass is to be cut and what glass work pieces are to be formed from the sheet. The location of the individual glass work pieces on the sheet is also generally noted along with break out order and storage location (i.e. storage rack and slot position).

Within the meaning of this application replacement pieces references those work pieces that have been damaged in processing and need to be replaced or remade. Replacement pieces may also be called re-cuts, remakes, rejects, re-dos, special pieces in the art. These other terms may be specific as to where in the production line the piece has been damaged, such as re-cuts are those that are ordered at the cutting table and remakes are those coming from further down stream. The phrase "replacement pieces" is intended to be a generic encompassing term for these components. Replacement pieces are often very critical in plant production, as, for example, a whole order may be held up until a few replacement pieces are formed (cut and processed) to complete the order.

Within the meaning of this application a furnace layout references a tempering furnace schedule and is a pre-defined position of the work pieces on the bed of the tempering furnace. It is important to have a defined layout to optimize the furnace operation and to allow the unloaders to easily identify the tempered work pieces. In one non-limiting embodiment of the present invention touch screen input controls are provided for the furnace operators for inputting work pieces to be dynamically scheduled directly into the cutting table optimizer.

The present invention operates with a dynamic cutting table optimizer and in one embodiment of the invention the dynamic cutting table optimizer includes a biasing factor for scheduling work pieces and wherein work pieces dynamically scheduled directly into the cutting table optimizer by the tempering furnace operators are given the highest priority. The Batch Ban® optimizer provides such a cutting table optimizer.

One non-limiting embodiment of the present invention provides an unloading station at the furnace that includes a changeable set of uniquely identifiable work piece storage locations, such as a slot on a harp rack, adjacent the unloading station with each storage location adapted to receive a work piece therein for subsequent processing. In addition to slots on harp racks the storage locations could be individual storage bins of an automated feeder that is unloaded and the storage location is then ready for a new work piece. Further, the harp racks may include storage locations that already have work pieces therein, such a work piece of a glass pair of a final unit that is not tempered.

In one non-limiting aspect of the present invention the invention includes a buffer storage location, also called a rare rack, adjacent the unloading station adapted to receive a work piece therein that is to be moved to a uniquely identifiable work piece storage location which is not yet adjacent the unloading station at the time the work piece reaches the unloading station.

In one non-limiting aspect of the present invention the invention provides that a subset of the uniquely identifiable work piece storage locations is moved away from the unloading station when it is filled, as determined by the overall scheduler as "filled" may be a relative term, with work pieces.

A new sub-set of uniquely identifiable work piece storage locations is moveable adjacent the unloading station to provide the changeable set of uniquely identifiable work piece storage locations. The dynamic furnace optimizer will bias work pieces scheduled on the furnace to those assigned to the uniquely identifiable work piece storage locations currently adjacent the unloading station.

In one non-limiting aspect of the present invention the furnace includes a loading station that includes a changeable set of uniquely identifiable work piece storage loading locations adjacent the loading station with each storage loading location adapted to receive a work piece therein for subsequent processing on the tempering furnace. A subset of the uniquely identifiable work piece storage loading locations is moved away from the loading station when it is emptied of work pieces for the tempering furnace and a new sub-set of uniquely identifiable work piece storage loading locations is moveable adjacent the loading station to provide the changeable set of uniquely identifiable work piece storage loading locations adjacent the loading station. In one non-limiting aspect of the invention, the dynamic furnace optimizer is adapted to schedule work pieces from uniquely identifiable work piece storage loading locations not currently adjacent the unloading station based upon a minimum yield gain. The dynamic furnace optimizer is adapted to schedule work pieces from uniquely identifiable work piece storage loading locations not currently adjacent the unloading station by at least one of manually loading work pieces from work piece storage loading locations not currently adjacent the unloading station; and removing selected work piece storage loading locations currently adjacent the unloading station that are not yet empty and mounting a new subset of selected work piece storage loading locations.

In one non-limiting aspect of the present invention the cutting table directly feeds the tempering furnace through a seaming unit. A seaming unit within the meaning of this application is a unit or series of stations designed to seam the edges of the glass work piece. The seaming of the edges is essentially grinding down the rough edges of the work pieces that can result from break out. Seaming minimizes thermal breakage in the tempering furnace.

A direct feed within the meaning of this application references the coupling of two pieces of glass processing equipment wherein there is no re-ordering of glass work pieces. In a direct feed arrangement between the equipment the glass work pieces are not moved to an intermediate storage and transport unit, such as a harp rack, that could provide for re-ordering of work pieces. In a direct feed arrangement within the meaning of this application defines a preset correspondence between the equipment, generally a one to one arrangement (i.e. one cutting table directly feeding one tempering oven). The preset correspondence could be a one to many or even many to one and still be a direct feed arrangement, such as a cutting table directly feeding a pair of tempering ovens. The direct feed arrangements utilize dedicated delivery devices (conveyor, auto-seaming unit, etc) for supplying the directly fed system. A system using a dedicated delivery device may not, however, be a direct feed device as the dedicated delivery device may also feed a buffer, such as a rare rack, that makes the system an indirect feed due to the possibility of re-ordering of work pieces.

Within the meaning of this application an indirect feed references the coupling of two pieces of glass processing equipment wherein there is the capability for re-ordering of glass work pieces between the equipment. In an indirect feed arrangement between the equipment, the glass work pieces may often be moved to an intermediate storage and transport unit, such as a harp rack, that could provide for re-ordering of work pieces. A direct feed arrangement can be modified to an indirect feed arrangement through the inclusion of an intermediate work piece holding buffer that allows for reordering of the pieces.

One non-limiting aspect of the present invention provides a method for controlling a glass production line having tempering furnace and glass cutting table, comprising the steps of: i) Dynamically scheduling cutting schedules for the glass cutting table with a dynamic cutting optimizer, including dynamically incorporating replacement pieces into the cutting schedule; and ii) Dynamically scheduling furnace layouts for glass work pieces to be tempered within the furnace on a dynamic furnace optimizer, wherein the dynamic furnace optimizer is integrated with the cutting table optimizer; and iii) Inputting at furnace input stations work pieces to be dynamically scheduled directly into the cutting table optimizer.

One non-limiting aspect of the present invention provides a glass production line comprising: a cutting table; a tempering furnace downstream of the cutting table; a dynamic optimizer coupled to the glass cutting table for dynamically scheduling cutting schedules for the glass cutting table, including dynamically incorporating replacement pieces into the cutting schedule, and a dynamic optimizer coupled to the tempering furnace for dynamically scheduling furnace layouts for glass work pieces to be tempered within the furnace, wherein the furnace optimizer is integrated with the glass cutting table optimizer, whereby furnace operators can input work pieces to be dynamically scheduled directly into the cutting table optimizer.

The particular advantages of the present invention will be described in connection with the attached figures wherein like reference numerals represent like elements throughout.

BRIEF DESCRIPTION OF THE DRAWINGS

FIG. 2 is a representative schematic view of an input screen for the cutting table optimizer of the present invention illustrating a proposed sheet layout;

DETAILED DESCRIPTION OF THE PREFERRED EMBODIMENTS

Figure 1:
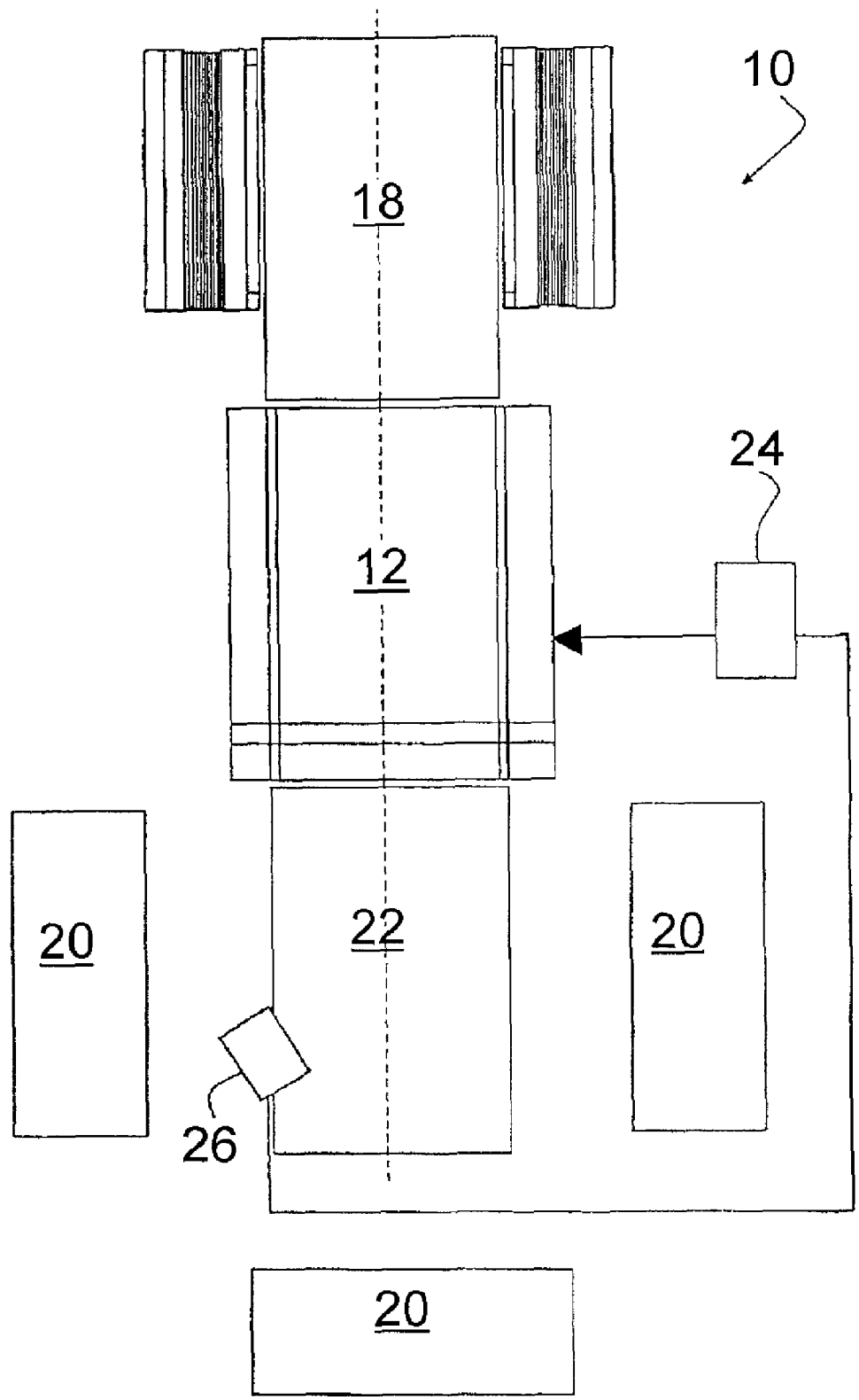
FIG. 1 is a schematic plan view of a cutting table of a glass cutting line, with the cutting table using a dynamic cutting table optimizer according to the present invention.

FIG. 1 schematically illustrates a glass product cutting line 10 according to the present invention. One central component of the cutting line 10 is a computer controlled of CNC glass cutting table 12 for cutting sheets of glass 14 into cut glass work pieces 16. The cutting table 12 itself is well known in the art such as those sold by Billco Manufacturing, Inc. The table 12 generally includes a cutting or scoring head mounted on a carriage which, in turn, is mounted on a bridge over the table surface. The bridge carries a track along which the carriage moves, and the bridge, in turn, is moved along tracks adjacent the table. The carriage and bridge from an X-Y positioning system for the cutting or scoring head.

A feeding device 18 is provided upstream of the table 12 for feeding glass sheets 14 to the glass cutting table 12. The feeding device 18 may include an air float table, such as manufactured by Billco Manufacturing Inc. Additionally the feeding device 18 may include an alignment mechanism for properly positioning the glass sheets 14 on the table 12. The feeding device 18 may include manual input for loading and positioning the sheets 14 on the cutting table 12 or the feeding may be automated. The feeding device 18 may be representative of several items such as a crane and a tilt loader from which sheet or stock is provided to the table 12. The feeding device 18 is merely representative of these conventional loading units.

The knowledge of the feeding units or devices 18 is important for a dynamic optimizer 24 of the present invention in that the glass sheets 14 on these devices 18 cannot be easily changed out, whereby when re-optimizing on the fly, the layout of pieces 16 on a sheet(s) 14 that is currently on the feeding device 18 can and presumably will occasionally be changed by the dynamic optimizer 24 prior to the piece getting to the cutting table 12, but the glass sheet type becomes essentially fixed when it is on the feeding device 18. The optimizer 24 will schedule, at least, the work pieces 16 from the sheet 14 on the cutter table 12 (as the cutter table 12 could not operate without such a schedule), and the work pieces 16 on sheet(s) 14 held on the feeding device 18 and at least the glass sheet 14 next to be placed onto the feeding device 18, as the production line will need to know which glass type to place onto the feeding device 18. The cutting layouts scheduled for the pieces 16 on sheets 14 held in the feeding device 18 and to be next moved to the feeding device 18 are subject to change in the dynamic optimizer 24, as noted above, however for the sheets 14 already on the feeding unit 18 it is only the rearrangement of different pieces 16 on that sheet 14 that are re-optimized, while a completely different sheet (different glass type) may be designated as to be next moved to the loading or feeding device 18 with subsequent re-optimizations.

A plurality of moveable, cut glass work piece 16 holding, harp racks 20 are positioned downstream of the table 12, with each harp rack 20 having a plurality of slots receiving the cut glass work pieces 16.

A sorting device or breakout table 22 is downstream of the table 12 for sorting the cut glass work pieces 16 and moving the cut glass work pieces 16 to the associated harp rack 20. The break out table 22 may be considered as part of the table 12 as well. The harp racks 20 are positioned adjacent the sorting device 22. The sorting device 22 may include an air float table similar to the feeding device 18. As with the feeding device 18, the sorting device 22 may utilize manual input for loading and positioning the work pieces 16 from the float table to the designated slots of the harp rack 20 or the loading may be automated. It is also within the present invention to have a cutting table 12 feed work pieces directly to downstream glass processing equipment, such as the tempering furnace through automatic feeding mechanism in a more continuous process as discussed below in connection with FIGS. 5 and 6.

The key feature of the cutting line 10 of the present invention is a dynamic cutting line control system or dynamic optimizer 24 coupled to the controller of the glass cutting table 12. The furnace optimizer component of the optimizer 24 can operate with a batch optimizer on the cutting lien, but greater advantages are achieved with integrating a dynamic furnace optimizer with a dynamic cutting table optimizer.

Cutting Table Dynamic Optimizer

The dynamic cutting table optimizer portion of optimizer 24 will optimize the layout of the glass work pieces 16 on the individual sheets of glass 14. A representative example of this optimization is illustrated in the schematic layout for "Sheet 1" on the touch screen input device display shown in FIG. 2. The general operation of an optimizer is believed to be known to those in the art. One significant feature of a preferred dynamic cutting table optimizer portion of the optimizer 24 of the present invention is the inclusion of an adjustable weighting or biasing for favoring individual cut glass work pieces 16 assigned to a leading harp rack 20, whereby the bias will tend to position and cut the glass work pieces 16 assigned to the leading harp rack 20 on leading sheets 14 to completely fill the leading harp rack 20 in a minimum time.

The dynamic cutting table optimizer 24 will re-optimize the cutting table schedule with each sheet, whereby the dynamic optimizer 24 of the present invention will still take into account all of the slots currently available in all of the harp racks 20 in optimizing the layout of the incoming sheet 14. The cutting table optimizer 24 simply weights, or favors, the work pieces 16 for the leading harp rack 20 to a greater extent. The weighting results in a filling of the leading harp rack 20 first, allowing the filled harp rack 20 to be removed from the cutting line 10 and sent for subsequent processing. It will be understood that the bias will change the layout that may otherwise be generated for the given sheet 14 and this might actually be a lower yield arrangement. However it is expected that this loss will be offset and the total yield loss may actually decrease by the avoidance of a last sheet, as will be described below. The improvement is the ability to move the filled rack 20 (the leading rack) to subsequent processing to avoid delays in subsequent processing. Essentially the cutting line 10 is no longer a batch process, but a dynamic, continuous process.

The biasing or weighting described for the present invention can be accomplished in any number of ways as will be appreciated by those in the art. For examples, negative weights may be added to the work pieces 16 assigned to the non-leading racks 20, effectively positively weighting the work pieces 16 assigned to the leading rack 20. The bias within the meaning of the present invention will be any system or method which makes it more likely that the work pieces 16 assigned to the leading rack 20 are processed or cut first. It is not expected that the cutting of the work pieces 16 assigned to the leading rack 20 be an absolute requirement.

The removal of a filled leading harp rack 20 from the glass cutting line 10 allows the control system 24 to designate a new leading harp rack 20 for the dynamic cutting table optimizer which dynamically adjusts the bias and associated cutting scheduling. This feature of the control system 24 is collectively called a harp rack removal accommodator or dynamic accommodator. The dynamic accommodator will reprioritize the remaining harp racks 20 and allow for the inclusion of a new harp rack 20 replacing the filled harp rack 20 that was removed. The reprioritization is simply assigning, or reassigning, a weighting or bias value to the specific harp racks. The next harp rack 20 to be removed will be the new leading harp rack 20 and will generally have the highest biasing or weighting factor. The bias referred can be associated with the harp racks 20 to which the work pieces 16 are assigned or can alternatively be considered to be associated directly with the work pieces 16.

The adding of replacement harp racks 20 is another key feature of the present invention in this mode which will advantageously affect total yield. This feature allows the cutting line to operate with any number of harp racks 20 regardless of the number of harp racks 20 that may be located around the sorting device 22.

As a simplistic illustrative example consider the cutting line 10 forming four separate product mixes for specific harp racks 20, referred to as rack mix A, B, C, and D respectively. It will be obvious that the traditional batch process of the prior art will require at least two separate production runs to be planned. Further complicating the matter may be that the racks may not be equally needed in subsequent processing lines (e.g. consider a distribution of 50% A, 30% B, 15% C and 5% D). This would further increase the number of separate batch runs (each with a separate last sheet) needed to accommodate the desired production with the prior art. The present cutting line 10 easily accommodated the product mixes by continuously adding harp racks 20 to the queue. The cutting line 10 thereby accommodated a greater number of harp rack types than can fit around the sorting device 22 and also easily accommodates a varying percentage of the distinct harp racks 20.

A harp rack can be used as a buffer for storing work pieces 16 that are cut well in advance of their need in the processing, and is called a rare rack (20R). With a rare rack, the rack may be used for temporary storage of work pieces that are then moved to a harp rack 20 when the appropriate harp rack comes up (so the work piece is moved from one rack to another). The rare rack adds further flexibility to the system.

The present control system 24 relies on the ability of the optimizer to dynamically optimize subsequent sheets. The optimization of each sheet 14 individually takes into account all of the available slots in the harp racks 20 currently adjacent the sorting device 22 and taking into account the bias for the leading harp rack(s) 20. The bias for the leading harp rack(s) 20 may be adjustable by the operator allowing for the operator to balance the overall yield obtained with the desire to decrease the time in filling the leading harp rack 20.

A further feature of the present invention is that the bias or weighting factor used for each harp rack 20 or each piece 16 may possibly change as the harp rack(s) 20 is closer to being filled. In other words the relative weighting factors for each harp rack 20 may also change as the harp rack 20 is filling up with work pieces 16 with the bias increasing as the harp rack 20 is closer to being filled. This relative increase or weighting in favor of almost filled harp racks 20 may be adjustable by the user so the operator can adjust the weighting increase and overall weighting values to balance yield and harp rack 20 filling rates.

The harp racks currently adjacent the table 22, or input point, can be referenced as "mounted" harp racks, and those that are not yet adjacent the table 22 are "un-mounted". Racks 20 that are filled and moved to subsequent processing will be referenced in association with the next processing step these racks are associated with (e.g. mounted temper furnace loading racks).

The current system is continuous, or at least a semi-batch process, or more accurately an overlapping batch process, and avoids the last sheet problem of the prior art. Further the control system 24 avoids much of the problem with re-cuts. When a re-cut is desired, the operator can simply input the desired re-cut and it will be automatically entered into the product mix with the desired weighting associated. For example if the leading harp rack 20 is almost filled and a re-cut is needed to complete the harp rack, the operator inputs the desired re-cut and the above described weighting procedure would prioritize this work piece 16. The leading harp rack 20 will be completed without waiting till the end of a production run as in much of the prior art. The input may be through an input device such as a display and/or touch screen 26 illustrated in FIG. 2. The operator merely touches on the image of the desired work piece 16 illustrated on the appropriate sheet 14 and a new screen allowing the entry of a re-cut request is shown to the operator.

The system also accommodates special pieces not in the original product mix (e.g. products not normally produced on this cutting line). The special pieces may not be associated with any harp rack and would likely be given the highest weighting. Alternatively a rare rack 20R may be positioned adjacent the sorting device 22 to accommodate and hold "rare" work pieces 16 namely those that are not associated with a mounted rack 20. The weighting of work pieces 16 assigned to such a rare rack 20 can be left to the operator. It is important to note that the highest weighting will not guarantee the subject piece is cut on the next sheet 14 it simply makes it more likely. In other words even with the priority weighting, work pieces 16 from non-leading harp racks 20 may be determined to be optimal by the cutting table optimizer.

Figure 3:
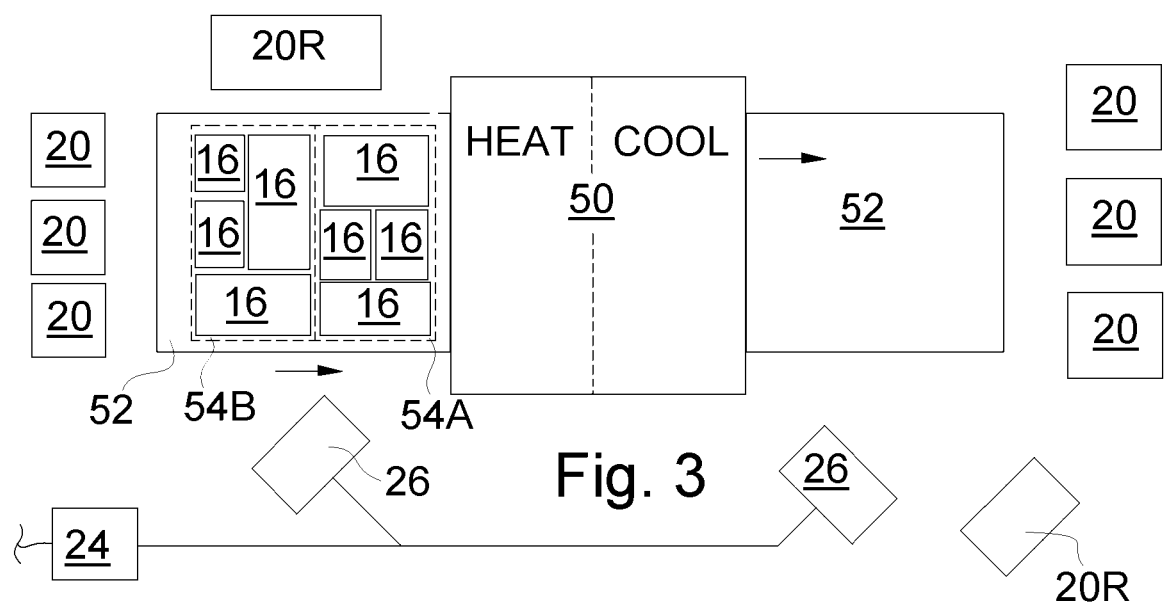
FIG. 3 is a schematic plan view of an indirect feed tempering furnace of a glass cutting line using a dynamic tempering furnace optimizer according to the present invention.

FIG. 3 is a schematic plan view of a portion of the glass cutting line with a continuous or batch bed filling operation using a dynamic continuous production control system according to the present invention. It is not uncommon for glass work pieces 16, after cutting, to be assembled into sheet type arrangements on a flat work piece supporting surface or conveyor 52 for transport through a processing unit or tempering furnace 50. The tempering furnace 50 can also be schematic of any bed loaded type glass proceeding equipment, although furnace layout is often more critical for efficiency of the system than in other bed arrangements, such as washing machines.

Figure 4:
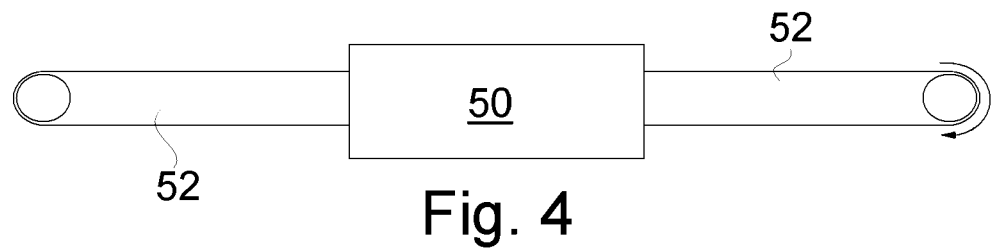
FIG. 4 is a schematic side view of a conveyor forming a bed for the tempering furnace of the glass processing line.

Within the meaning of this application the work supporting surfaces for receiving the sheet type work pieces are beds. Typically, the beds are work piece conveyors 52 as shown in FIGS. 3 and 4. The beds or conveyors 52 convey the work pieces 16 through the heating and cooling zones of a tempering furnace 50.

The conveyor or bed 52 may be indexed or may be continuously moving. The work pieces 16 are placed thereon as shown. It is advantageous if the work pieces 16 are placed close together to maximize through put, and save time and total energy costs. In one aspect of the present invention the furnace controller or dynamic furnace optimizer portion of the optimizer 24 will consider the entire bed surface over the production run and optimize the glass work piece 16 positions to minimize space. This calculation itself is a conventional optimization step. This optimization calculation will define a schedule of work pieces 16 needed to fill the bed in the appropriate order. This production schedule may be divided into a series of individual or overlapping sections or frames shown at 54a and 54b in FIG. 3. Display and touch screen input devices 26 would be used to identify where particular production pieces 16 are located in each bed frame 54, and operators can follow this guideline for manually loading and unloading of the bed 52. If automated loaders/unloaders are used the display merely identifies part location to the operators for reference.

In one non-limiting aspect of the present invention, the leading harp racks 20 may correspond to one or more leading bed frames 54a and 54b. In other words the optimization of the bed 52 over a production cycle will create a production list or schedule that defines the harp rack order for the cutting table optimizer. A batch type furnace optimizer could be used for this feature of the present invention. However, as described below, significant improvements are achieved with a dynamic furnace optimizer.

As noted above, some work pieces 16 may have alternative processing that does need unit 50 and as such some harp racks 20 from the cutting table 12 would be destined for other locations within the glass processing system. The present invention can easily accommodate other processing lines by having the controller 24 merge various production schedules to form a master listing which can then utilize the optimization discussed above. The incorporation of other processing lines does not alter the benefit or general operation of the present invention as it relates to bed filling glass processing.

A rare rack 20R may be used for temporary storage of work pieces 16 that are moved from a rack 20 to essentially empty and remove that rack without waiting for the bed frame 54 for that specific piece 16. The rare rack stored pieces 16 are then moved to the bed 52 when the appropriate bed frame 54 comes up. The rare rack 20R adds further flexibility to the system and can significantly increase efficiency.

The bed frames 54 may be comprised of segments as shown, but in continuously moving conveyors the length of each frame along the length of the conveyor may be minimized or effectively ignored whereby the system is optimizing the bed 52 only considering the width of the conveyor. This is applicable where the pieces 16 have one common dimension (e.g. a common length) and the work pieces 16 are not intended to change orientation through the unit 50, such as for certain curing arrangements.

As noted above the present system is dynamic and accommodates re-cuts, special orders and the like. Consequently, the controller 24 will have the furnace optimizer consider the entire remaining bed surface over the remaining production run with any changes in the run cycle and the system will optimize the glass work piece 16 positions to minimize space over the remaining portion. This calculation is a dynamic bed optimization step. This optimization calculation will define a remaining schedule of work pieces 16 needed to fill the bed 52 in the appropriate order to define the leading bed frames 54 and associated harp racks 20 for processing. The controller 24 will operate as noted above to control the cutting table 12 in, preferably a dynamic fashion.

Figure 5:
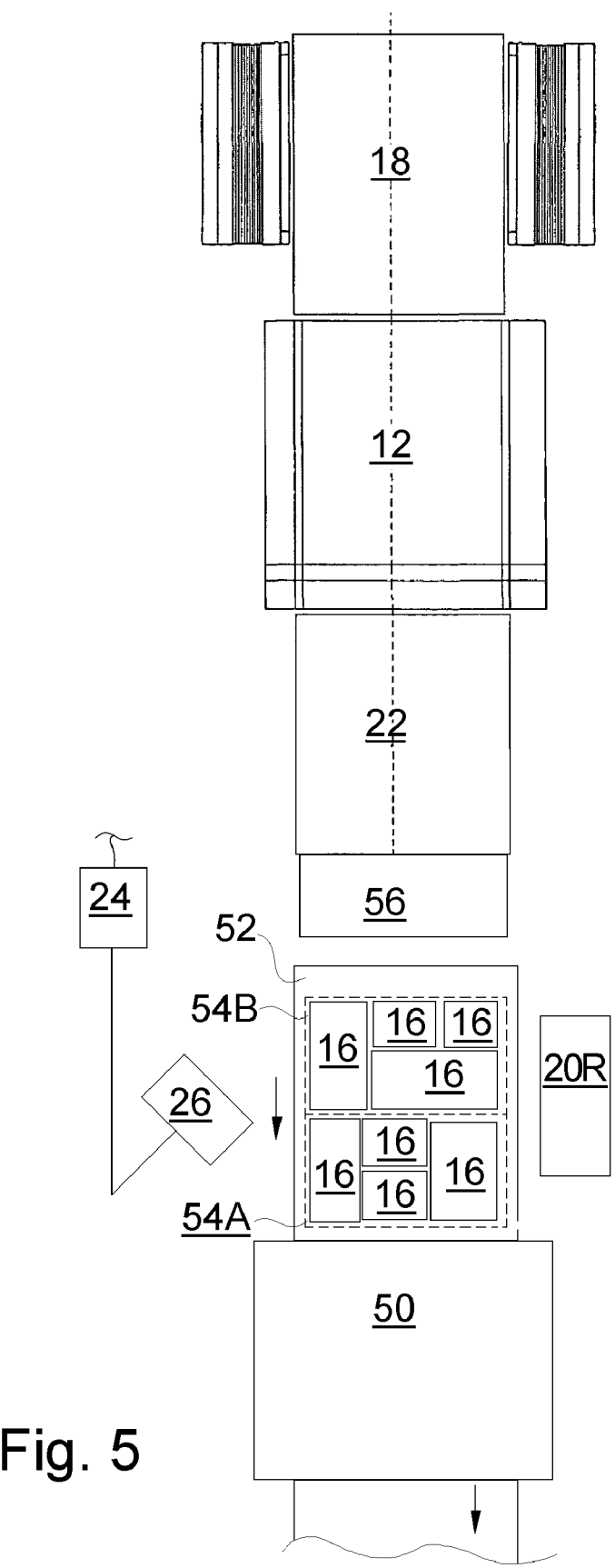
FIG. 5 is a schematic plan view of a glass cutting line with a cutting table and an indirect feed tempering furnace using an integrated dynamic continuous production control system according another aspect of the present invention.

The present invention anticipates that it may be desirable to have a cutting table 12 feed work pieces 16 directly to downstream glass processing equipment 50 (such as a tempering oven, autoclave or roll coater) through automatic feeding mechanism 56 in a more continuous process. This construction is shown in FIG. 5. In this embodiment the feeding mechanism will typically have limited or no work piece storage and will act as a harp rack and work piece feeder. In some case the work piece 16 will merely be transported to the bed 52 in the designated location within the leading bed frame 54a, while others will be stored until the bed frame 54 associated with that work piece is in a loadable position (i.e. until the conveyor is indexed sufficiently to bring the associated frame in a loadable position). A rare rack 20R can be provided to add further flexibility if the feeder 56 does not have storage capability, but the rare rack 20R can be easily incorporated into the design of the feeder 56 forming a dynamic buffer. With no storage in the feeder 56 and no rare rack, then the system of FIG. 5 would be a direct feed between the cutting table 12 and the furnace 50.

In this embodiment the controller 24 will optimize the cutting table 12 with the leading bed frame 54 as the "leading storage position", and once filled a new leading bed frame 54 is designated. In this embodiment the furnace optimizer and cutting table optimizer are effectively merged. Again one key to the present invention is that the optimizer for the cutting table 12 tends to cut the needed work pieces 16 in the order that they will be used, but this is only a biasing factor and some work pieces will be cut in advance of their position in the processing, and would be stored in the buffer or rare rack.

This optimization is re-run constantly to create a dynamic non-batch type system that easily accommodates replacement pieces.

Both of the embodiments of the present invention shown in FIGS. 1-5 provide a dynamic product control system in a glass work piece manufacturing plant for a product production line having a plurality of processed work pieces that must fill a bed during work piece processing, the control system comprising: an optimizer coupled to the product production line optimizing the work piece scheduling, wherein the optimizer is configured to divide the bed into bed frame portions and further includes a biasing for favoring individual work pieces assigned to at a leading bed frame position, whereby the bias will tend to schedule and process the work pieces assigned to the leading bed frame position to completely fill the leading bed frame position in a minimum time; and a dynamic accommodator coupled to the optimizer, wherein the leading bed frame position is undesignated as the leading bed frame position in the glass manufacturing plant product production line and the dynamic accommodator designates a new leading bed frame position for the optimizer.

Figure 6:
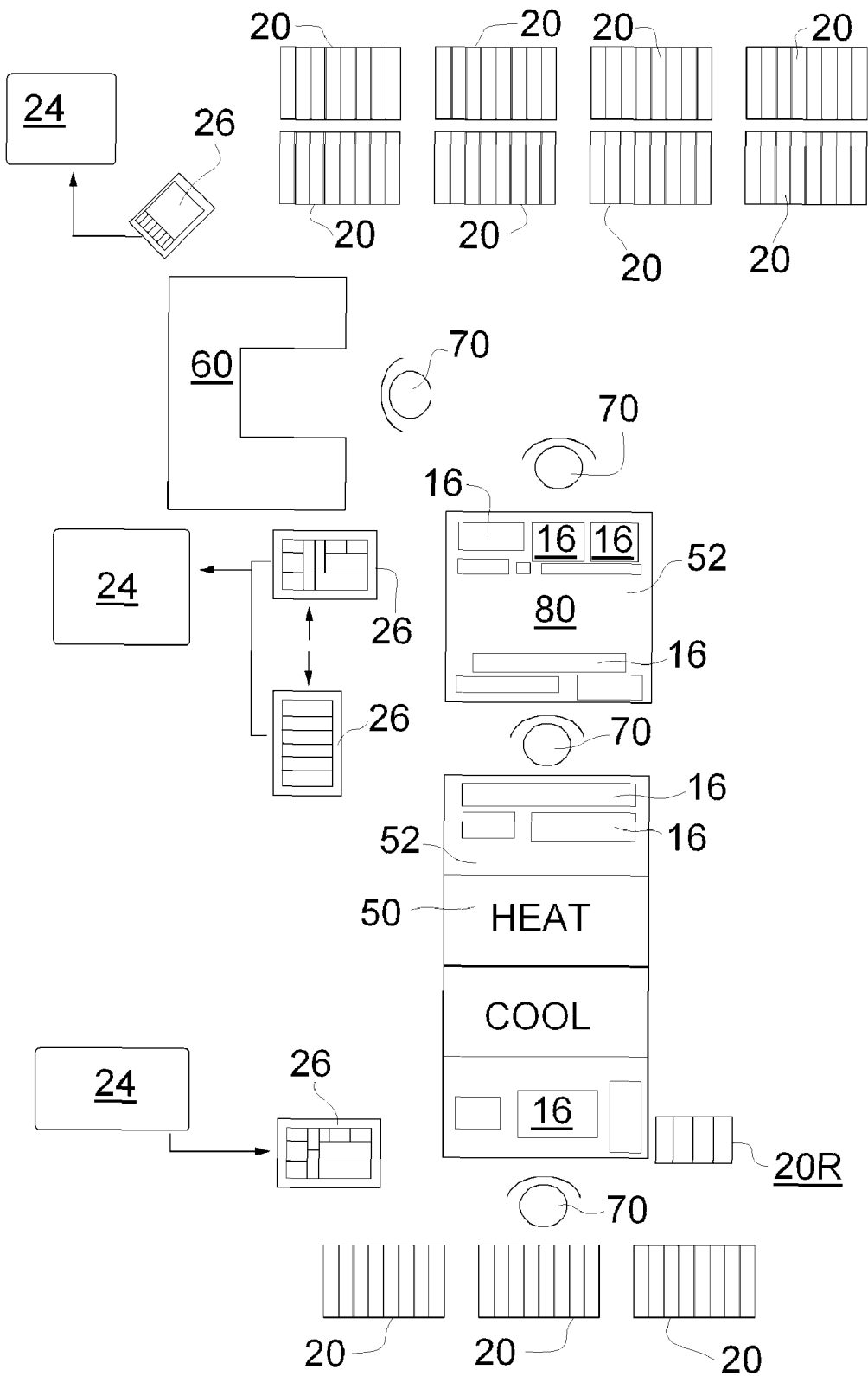
FIG. 6 is a schematic plan view of a glass cutting line with a cutting table and an indirect feed tempering furnace using an integrated dynamic continuous production control system according another aspect of the present invention.

FIG. 6 illustrates schematically a batch-less furnace optimizer in accordance with the present invention. In the figures a seaming unit 60 designed to seam the edges of the cut work pieces 16 and is operated by user or operator 70. The seaming unit 60 is fed by a series of mounted racks 20 shown in the second row of racks. The mounted racks are those that are positioned in an unloading location at the seaming unit 20. Un-mounted racks 20 are those racks that are in the cue but not positioned in a specific unloading location at the unit 60. A touch screen monitor 26 adjacent the unit 60 gives the operator 70 the information regarding the schedule and allows the operator to enter replacement pieces, due to piece damage and breakage.

Figure 7:
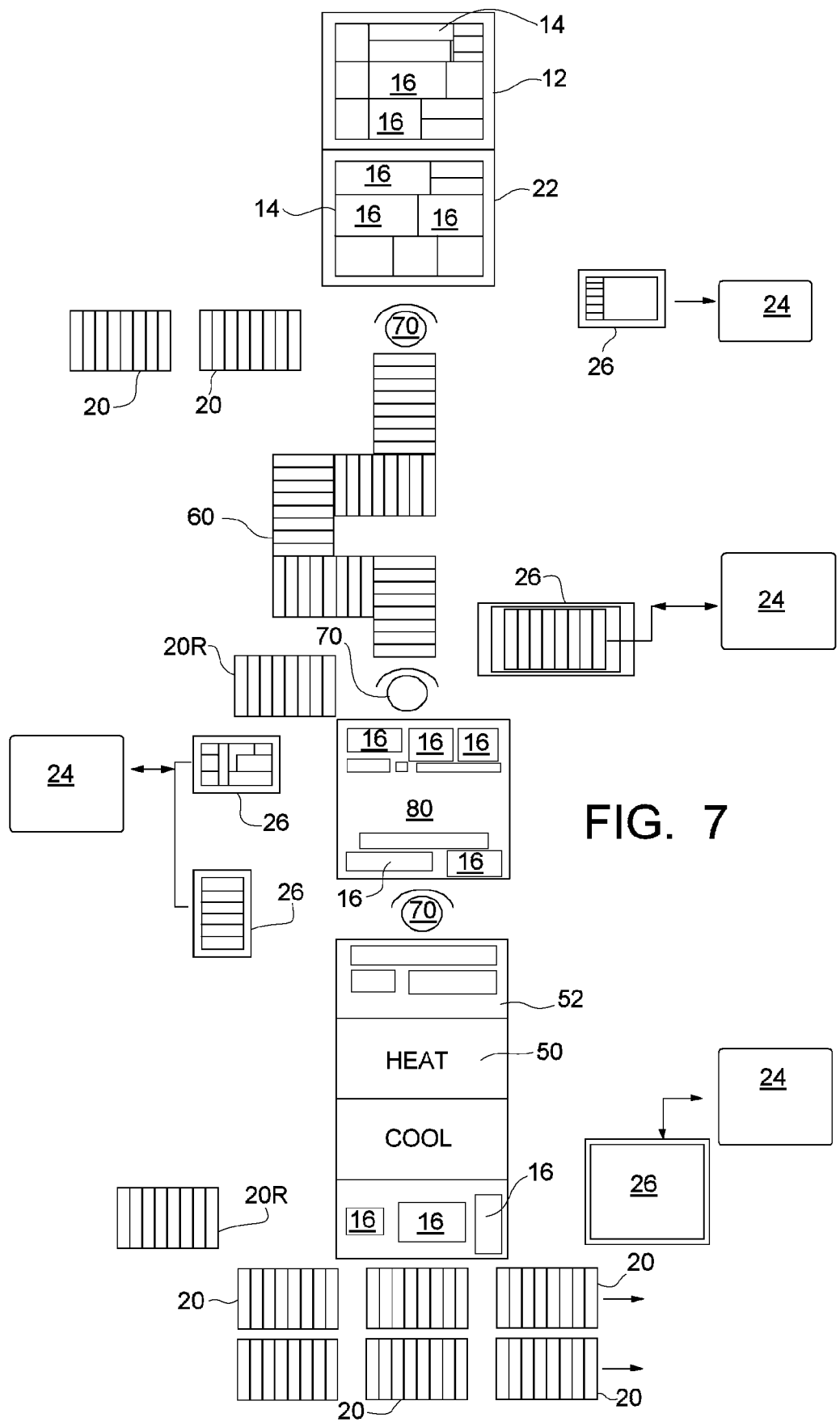
FIG. 7 is a schematic plan view of a glass cutting line with a cutting table and an indirect feed tempering furnace having a dedicated delivery device and using an integrated dynamic continuous production control system according another aspect of the present invention.

Following the seaming unit 60 is a washing machine 80 that is manned by loading operator 70. The washing machine 80 uses a bed 52 similar to that described above in connection with the furnace 50. The washing machine 80 is adjacent a furnace 50 and a single operator 70 can be used to unload the washer and load the furnace bed 52. An operator 70 at the furnace unload location can unload the work pieces 60 and place them into mounted racks 20. A rare rack 20R can be positioned here to allow the user 70 to place work pieces 16 into the rare rack if that designated rack is not mounted yet. The rare rack can be placed at the leading end of the furnace, washer or seaming unit as well, such as represented in FIG. 7. Displays 26, each coupled to controller 24, are provided for each operator 70 to identify the piece location and to allow the input or replacement pieces by any operator 70. The order and layout in the seaming unit 60 and washer 80 is likely determined by the optimized bed 52 of the furnace 50, which is why these components are not illustrated in the schematic representation of FIGS. 1-5. FIG. 6 illustrates a more comprehensive illustration of the tempering operation.

FIG. 7 illustrates schematically an alternative batch-less furnace optimizer in accordance with the present invention. In the figures a seaming unit 60 designed to seam the edges of the cut work pieces 16 and is operated by user or operator 70. The seaming unit 60 is fed here directly by the break out table 22 of the cutting table. Racks 20 are provided to allow users to place work pieces 16 that are not designated for tempering. The seaming unit 60 schematically represented in FIG. 7 is an automated seaming unit, whereby the operator(s) merely loads and unloads the work pieces 16. A touch screen monitor 26 adjacent the unit 60 gives the operators 70 the information regarding the schedule and allows the operator to enter replacement pieces, due to piece damage and breakage.

Following the seaming unit 60 is a washing machine 80 that is manned by loading operator 70/seaming unit 80 unloading operator). The washing machine 80 uses a bed 52 similar to that described above in connection with the furnace 50. A rare rack 20R can be positioned here to allow the user 70 to place work pieces 16 into the rare rack if the work piece is not yet scheduled for tempering and racking. The provision of a rare rack up-stream of the furnace and downstream of the cutting table 12 makes it an indirect feed between the cutting table and the furnace 50 as the order can easily be changed. The washing machine 80 is adjacent a furnace 50 and a single operator 70 can be used to unload the washer and load the furnace bed 52. An operator 70 at the furnace unload location can unload the work pieces 60 and place them into mounted racks 20. A rare rack can be placed at the trailing end of the furnace as well, such as represented in FIG. 6. Displays 26, each coupled to controller 24, are provided for each operator 70 to identify the piece location and to allow the input or replacement pieces by any operator 70. The order and layout in the seaming unit 60 and washer 80 is likely determined by the optimized bed 52 of the furnace 50, which is why these components are not illustrated in the schematic representation of FIGS. 1-5. FIG. 7 illustrates a more comprehensive illustration of the tempering operation.

Dynamic Furnace Optimizer

The dynamic furnace optimizer will have to be able to function in two fundamentally different ways based upon the way in which glass work pieces 16 are brought into the system, namely the furnace 50 and associated components. It should be noted that the present invention prefers that a dynamic optimizer be used for the cutting table 12 as described above. However, there remain advantages to they integrated system if the cutting table optimizer is a batch type optimizer known in the prior art.

In the first case, shown in FIG. 6, and referred to as a non-direct-feed method, an entire batch schedule (consisting of racks of pieces) will be imported into the dynamic furnace optimizer from the cutting table optimizer. If the Batch optimizer is used for the cutting table then this will be an entire unchanging batch. With the dynamic cutting table optimizer this input will be a changing data stream.

In the second case, generally shown in FIG. 6 (from here on referred to as direct-feed method), the glass pieces will be coming directly from the cutter one-by-one via a conveyer belt. In this direct-feed method the furnace optimizer will only be able to pick and choose from a very limited number of pieces consisting of the items that, at the time of the optimization, are on the cutter, the breakout table, the conveyer belt, and the rare rack at the washer/oven entrance (although the provision of the rare rack technically allows for an indirect feed). In this method, the time it takes for pieces to travel from the cutter to tempering will also plays major role.

Logic Flow: Each piece of glass will have two different rack assignments associated with them in the furnace optimizer. One rack assignment will be used for when the piece is entering the system (from here on referred to as incoming rack-assignment), and the other for when its leaving (from here on referred to as outgoing rack-assignment). This is necessary because it is possible that a user would want to re-rack the pieces after tempering them based on where each piece would have to go after the tempering process.

Each piece will also be assigned with the appropriate recipe that is to be used when tempering that piece. The operator 70 will be able to set up the recipes in the software based on glass type, glass thickness, and part-size range.

Once each piece has been assigned the appropriate recipe, the user will be asked to mount the first given number of racks at the end of the furnace (outgoing racks 20). The racks that are selected will be based on the outgoing rack-assignment. Once the appropriate outgoing racks have been mounted, the software will figure out which incoming racks have to be mounted order to ensure that the outgoing racks are completed. The software will only mount up to $y^2$ number of incoming racks.

The software will select the pieces to be considered for each layout based on the following factors order by consideration priority:

1) Outgoing rack priority
2) Recipe
3) Part size (largest to smallest area)

When generating the layouts, the software will look ahead a given, possibly user adjustable number of outgoing racks if the layout generated does not exceed the minimum allowable layout yield in order to find a piece that it can use to improve the yield. In the back end of the furnace this piece would be placed into the rare rack until the appropriate outgoing rack gets mounted. When that rack gets mounted, the operator at the end of the furnace will be instructed to move pieces from the rare rack into the destination outgoing rack.

The system could have a look ahead for incoming racks as well; looking to un-mounted racks that are available that would generate greater yield increases, which may overcome the additional handling associated with loading from an un-mounted rack. This means that the user can control the efficiency of the system by mounting more racks at both ends of the furnace, and by increasing the number of look-ahead racks that the software is allowed to consider.

After both the incoming and outgoing racks have been mounted, the software will start generating layouts based on the furnace specific rules associated with the bed optimization.

The system for the furnace optimizer may consist of a distributed software made up of three separate standalone applications running on (two or) three different PCs each equipped with its own monitor. Below is a breakdown of each software component's role and physical location in the overall system:

Monitor 1: main software component, providing input for the other two applications enables users to setup recipes
importing and managing (changing the priorities) of racks/schedules monitoring of both incoming and outgoing racks displaying instructions on which piece the operator should seam next using the incoming rack-assignments generation of layouts for both incoming and outgoing enabling users to enter/manage remake pieces reporting monitoring of foot-pedal switch(es)

usual system functionalities (monitor/change software settings, users, etc.)

Monitor 2:

This component will be placed where the pre-oven staging area is

Figure 8A:
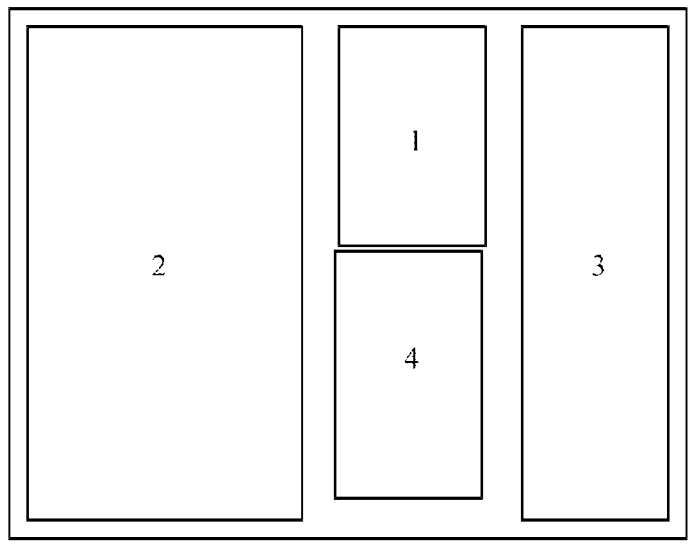
FIG. 8a is a representative schematic monitor display of a layout as it's going into the oven using sequence numbers instead of rack assignments.

It'll display the layout as it's going into the oven using sequence numbers instead of rack assignments as shown in FIG. 8a.

monitoring of foot-pedal switch(es) enabling users to enter remake pieces

Figure 8B:
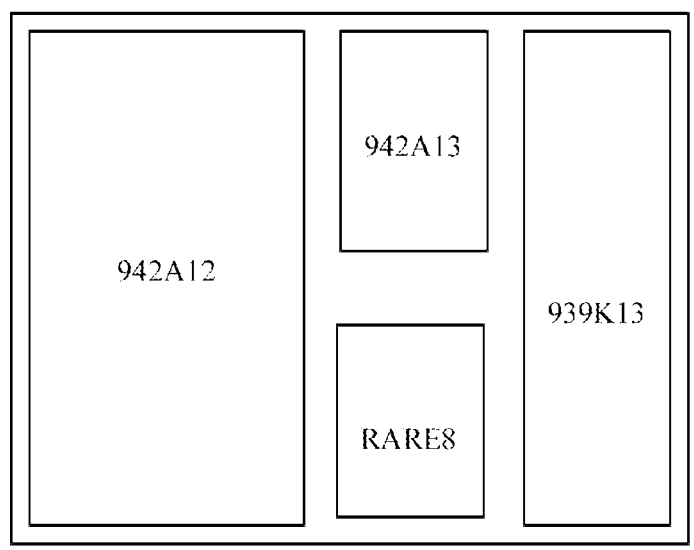
FIG. 8b is a representative schematic monitor display of the layout as its coming out of the oven using outgoing rack assignments instead of sequence numbers.

Monitor 3:

displaying of the layout as its coming out of the oven using outgoing rack assignments instead of sequence numbers as shown in FIG. 8b.

monitoring of foot-pedal switch(es) enabling users to enter remake pieces monitor the content of each outgoing rack, including the rare rack Components 1 and 2 will run on the same PC if the same person performs both the seaming and the building of the incoming furnace bed layout. Also, the second monitor can either be before or after the washer depending on where the staging for the furnace takes place. The number of stages in the furnace may also be a user configurable setting.

Logic Flow: Direct feed method of FIG. 7. Just as with the non-direct-feed method, each piece has to be associated with the appropriate recipe. This process will be handled exactly the same way in this method as it was in the non-direct-feed method, in which the user will be able to setup recipes based on glass type, glass thickness, and part-size range. Also, just as in the other method, each piece should have an outgoing rack assignment for the back-end of the furnace. However, as mentioned earlier, the main difference between this method and the previous method is that in this method the user will not import a whole schedule into the system manually.

The cutter's breakout table will be connected to the furnace via an automated seaming line. Operators at the cutter will follow a predefined sequence when breaking out each piece of glass. The furnace optimizer will have access to this sequence information via an interface (bridge file, message queue, direct DB access, etc). Each sequence number on every sheet is going to be directly associated with a unique ordered piece. This will allow us to gain access to any information the furnace optimizer may need, such as glass type, shape information, etc. After breaking out each piece, the operators will place them on the auto-seamer's conveyer following the earlier mentioned sequence numbers. This way, the system will know exactly which piece is coming down the auto-seamer's conveyer. The system may include a foot pedal here so that the system knows exactly what pieces are in the seamer queue.

Once the pieces are seamed, they'll either be put on the washer/furnace's (wherever the staging will take place) conveyer to be part of the next layout, or be placed into a rare rack that will be kept at this location. Pieces will only be placed in the rare rack if they are very unfavorable for the current layout.

Pieces that are stored in the rare rack will get considered for the layout every time. However, pieces that are about to come out of the auto-seamer will have a higher priority than pieces in the rare rack. This will ensure that we only use the rare rack when its really necessary. However, pieces at the start of the auto-seamer (closest to the breakout table) should have a lower priority than pieces in the rare rack. This will ensure that pieces don't sit in the rare rack for too long. The software will select the pieces to be considered for each layout based on the following factors order by consideration priority: Piece priority (Queue position of the piece); a, pieces that are in the auto-seamer closest to the furnace b, pieces on the rare rack c, pieces that are in the auto seamer closest to the cutter's breakout table d, pieces on the breakout table e, pieces on the cutter 2Recipe Part size (largest to smallest area) Outgoing rack priority The order in which the above four priorities will be considered can be changed, however, changing the priority of one will result in the penalty of another. For example, if piece priority is no longer the highest priority, the rare rack will have to be used much more in order to store pieces that we cannot consider for the current layout.

The main priority should be the piece priority. If we change the priority order of the rest of them, it will not affect the outcome as much, but non-the-less, it will affect either the use of the rare rack and/or the furnace yield in a negative way. The exact weight number of each piece in the queue may have to be tweaked during design and installation. The further away from the furnace's entrance a piece is, the lower priority the piece should have.

Another factor that plays crucial role in this method is time. Specifically, the amount of time we have to wait for pieces to become available to be considered for a layout, and the amount of time it takes for a piece to travel from a certain location in the queue, to the furnace. The first time factor is determined by the speed of the furnace, while the other is dependent upon the location of the piece in the queue, the auto-seamer's speed, the speed at which operators are able to break out glass, and the speed of the cutter. Most likely, however, the system will only be able to consider pieces for layouts that are either near the furnace end of the seamer, or are in the rare rack, due to the time constraint provided by the speed of the oven.

Foot-pedal switches may be used by operators to indicate when a piece leaves and possibly enters the seamer. The algorithm used for generating the layouts in this case will have to be different from that used with the non-direct-feed method. It'll more resemble the well known shelf algorithm including the application of the furnace specific rules.

The system, again, may consist of distributed software made up of two separate standalone applications running on two different computers each equipped with its own monitor. Below is a breakdown of each software component's role and physical location in the overall system:

Monitor 1:

main software component, providing input for the other two applications this component will be placed where the pre-oven staging area is enables users to setup recipes monitoring of pieces in the queue including each piece in the seamer monitoring of outgoing racks keeping track of items in the rare rack generation of layouts for both incoming and outgoing enabling users to enter/manage remake pieces reporting monitoring of foot-pedal switch(es)

usual system functionalities (monitor/change software settings, users, etc.)

it'll display the layout as its going into the oven using sequence numbers instead of rack assignments.

Monitor 2:
  displaying of the layout as its coming out of the oven using outgoing rack assignments instead of sequence numbers. monitoring of foot-pedal switch(es) enabling users to enter remake pieces
  monitor the content of each rack, including the rare rack The present invention as described herein provides a production control system 24 for glass production line having a tempering furnace 50 and glass cutting table 12. This production control system 24 has a dynamic optimizer coupled to the glass cutting table 12 for dynamically scheduling cutting schedules of work pieces 16 for the glass cutting table 12, including dynamically incorporating replacement pieces 16 into the cutting schedule. This production control system 24 has a dynamic optimizer coupled to the tempering furnace 50 for dynamically scheduling furnace layouts on bed 52 for glass work pieces 16 to be tempered within the furnace 50. A key component of the present invention is that this production control system 24 has the furnace optimizer integrated with the glass cutting table optimizer, whereby furnace operators 70 can input work pieces 16 (e.g. replacement pieces) to be dynamically scheduled directly into the cutting table optimizer.

The displays 26 provide, preferably, touch screen input controls for the furnace operators 70 for inputting work pieces 16 to be dynamically scheduled directly into the cutting table optimizer of the controller 24. Other input devices, such as keyboard, mouse, joystick can be used as well.

As noted above, in the production control system of the invention the dynamic cutting table optimizer includes a biasing factor for scheduling work pieces. In one embodiment of the invention work pieces dynamically scheduled directly into the cutting table optimizer by the tempering furnace operators are given the highest priority.

In one embodiment of the invention the furnace includes an unloading station that includes a changeable set of uniquely identifiable work piece storage locations adjacent the unloading station with each storage location adapted to receive a work piece therein for subsequent processing; further including a buffer storage location adjacent the unloading station adapted to receive a work piece therein that is to be moved to a uniquely identifiable work piece storage location which is not yet adjacent the unloading station at the time the work piece reaches the unloading station.

Although the present invention has been described with particularity herein, the scope of the present invention is not limited to the specific embodiment disclosed. It will be apparent to those of ordinary skill in the art that various modifications may be made to the present invention without departing from the spirit and scope thereof.

What is claimed is:

1. A dynamic tempering furnace optimizer for production control of a tempering furnace of a glass production line, said dynamic tempering furnace optimizer coupled to the tempering furnace for dynamically scheduling furnace layouts for glass work pieces to be tempered within the furnace, wherein the furnace includes a loading station that includes a changeable set of uniquely identifiable work piece storage loading locations adjacent the loading station with each storage loading location adapted to receive a work piece therein for subsequent processing on the tempering furnace, wherein a subset of the uniquely identifiable work piece storage loading locations is moved away from the loading station when it is emptied of work pieces for the tempering furnace and a new sub-set of uniquely identifiable work piece storage loading locations is moveable adjacent the loading station to provide the changeable set of uniquely identifiable work piece storage loading locations adjacent the loading station, and wherein the dynamic furnace optimizer is adapted to schedule work pieces from uniquely identifiable work piece storage loading locations.

2. The dynamic tempering furnace optimizer of claim 1, wherein the furnace includes an unloading station that includes a changeable set of uniquely identifiable work piece storage locations adjacent the unloading station with each storage location adapted to receive a work piece therein for subsequent processing, and further including a buffer storage location adjacent the unloading station adapted to receive a work piece therein that is to be moved to a uniquely identifiable work piece storage location which is not yet adjacent the unloading station at the time the work piece reaches the unloading station.

3. The dynamic tempering furnace optimizer of claim 1, wherein glass production line includes a cutting table with a cutting table optimizer, wherein the furnace optimizer is integrated with the glass cutting table optimizer, whereby furnace operators can input work pieces to be dynamically scheduled directly into the cutting table optimizer.

4. The dynamic tempering furnace optimizer of claim 3, further including touch screen input controls for the furnace operators for inputting work pieces to be dynamically scheduled directly into the cutting table optimizer.

5. The production control system of claim 4, wherein the dynamic cutting table optimizer includes a biasing factor for scheduling work pieces and wherein work pieces dynamically scheduled directly into the cutting table optimizer by the tempering furnace operators are given the highest priority.

6. The dynamic tempering furnace optimizer of claim 5, wherein a subset of the uniquely identifiable work piece storage locations is moved away from the unloading station when it is filled with work pieces and a new sub-set of uniquely identifiable work piece storage locations is moveable adjacent the unloading station to provide the changeable set of uniquely identifiable work piece storage locations, and wherein the dynamic furnace optimizer will bias work pieces scheduled on the furnace to those assigned to the uniquely identifiable work piece storage locations currently adjacent the unloading station.

7. The dynamic tempering furnace optimizer of claim 6 wherein the subsets of uniquely identifiable work piece storage locations are formed by movable harp racks.

8. The dynamic tempering furnace optimizer of claim 1, and wherein the dynamic furnace optimizer is adapted to schedule work pieces from uniquely identifiable work piece storage loading locations not currently adjacent the unloading station by at least one of manually loading work pieces from work piece storage loading locations not currently adjacent the unloading station; and removing selected work piece storage loading locations currently adjacent the unloading station that are not yet empty and mounting a new subset of selected work piece storage loading locations.

9. The dynamic tempering furnace optimizer of claim 8, wherein the subsets of uniquely identifiable work piece storage loading locations are formed by movable harp racks.

10. A glass production line comprising:
  A cutting table;
  A tempering furnace downstream of the cutting table;
  A dedicated delivery device feeding work pieces from the cutting table to the tempering furnace;
  A dynamic optimizer coupled to the tempering furnace for dynamically scheduling furnace layouts for glass work pieces to be tempered within the furnace, wherein the furnace includes an unloading station that includes a changeable set of uniquely identifiable work piece storage locations adjacent the unloading station with each storage location adapted to receive a work piece therein for subsequent processing, and further including a buffer storage location adjacent the unloading station adapted to receive a work piece therein that is to be moved to a uniquely identifiable work piece storage location which is not yet adjacent the unloading station at the time the work piece reaches the unloading station.

11. The glass production line of claim 10, further including a glass cutting table optimizer, wherein the furnace optimizer is integrated with the glass cutting table optimizer, whereby furnace operators can input work pieces to be dynamically scheduled directly into the cutting table optimizer.

12. The glass production line of claim 10, wherein a subset of the uniquely identifiable work piece storage locations is moved away from the unloading station when it is filled with work pieces and a new sub-set of uniquely identifiable work piece storage locations is moveable adjacent the unloading station to provide the changeable set of uniquely identifiable work piece storage locations, and wherein the dynamic furnace optimizer will bias work pieces scheduled on the furnace to those assigned to the uniquely identifiable work piece storage locations currently adjacent the unloading station.

13. The glass production line of claim 10, further including a buffer selectively receiving work pieces between the dedicated delivery device and the furnace.

14. A glass production line comprising:
A cutting table;
A tempering furnace downstream of the cutting table;
A dedicated delivery device feeding work pieces from the cutting table to the tempering furnace; and
A dynamic optimizer coupled to the tempering furnace for dynamically scheduling furnace layouts for glass work pieces to be tempered within the furnace, wherein the furnace includes a loading station that includes a changeable set of uniquely identifiable work piece storage loading locations adjacent the loading station with each storage loading location adapted to receive a work piece therein for subsequent processing on the tempering furnace, wherein a subset of the uniquely identifiable work piece storage loading locations is moved away from the loading station when it is emptied of work pieces for the tempering furnace and a new sub-set of uniquely identifiable work piece storage loading locations is moveable adjacent the loading station to provide the changeable set of uniquely identifiable work piece storage loading locations adjacent the loading station, and wherein the dynamic furnace optimizer is adapted to schedule work pieces from uniquely identifiable work piece storage loading locations.

15. The glass production line of claim 14, wherein the furnace includes an unloading station that includes a changeable set of uniquely identifiable work piece storage locations adjacent the unloading station with each storage location adapted to receive a work piece therein for subsequent processing, and further including a buffer storage location adjacent the unloading station adapted to receive a work piece therein that is to be moved to a uniquely identifiable work piece storage location which is not yet adjacent the unloading station at the time the work piece reaches the unloading station.

16. The glass production line of claim 14, wherein glass production line includes a cutting table optimizer, wherein the furnace optimizer is integrated with the glass cutting table optimizer, whereby furnace operators can input work pieces to be dynamically scheduled directly into the cutting table optimizer.

17. The glass production line of claim 16, further including touch screen input controls for the furnace operators for inputting work pieces to be dynamically scheduled directly into the cutting table optimizer.

18. The glass production line of claim 17, wherein the dynamic cutting table optimizer includes a biasing factor for scheduling work pieces and wherein work pieces dynamically scheduled directly into the cutting table optimizer by the tempering furnace operators are given the highest priority.

19. The glass production line of claim 18, wherein a subset of the uniquely identifiable work piece storage locations is moved away from the unloading station when it is filled with work pieces and a new sub-set of uniquely identifiable work piece storage locations is moveable adjacent the unloading station to provide the changeable set of uniquely identifiable work piece storage locations, and wherein the dynamic furnace optimizer will bias work pieces scheduled on the furnace to those assigned to the uniquely identifiable work piece storage locations currently adjacent the unloading station, and wherein the subsets of uniquely identifiable work piece storage locations are formed by movable harp racks.

* * * * *